(12) United States Patent
Anderson et al.

(10) Patent No.: US 9,365,980 B2
(45) Date of Patent: Jun. 14, 2016

(54) PACKAGING MATERIAL HAVING MOISTURE BARRIER AND METHODS FOR PREPARING SAME

(75) Inventors: Dennis W. Anderson, Goshen, OH (US); Patricia L. Ewing, Memphis, TN (US); Timothy J. Bradford, Killen, AL (US); Michael J. Murphy, Collierville, TN (US)

(73) Assignee: International Paper Company, Memphis, TN (US)

( * ) Notice: Subject to any disclaimer, the term of this patent is extended or adjusted under 35 U.S.C. 154(b) by 1221 days.

(21) Appl. No.: 13/289,443

(22) Filed: Nov. 4, 2011

(65) Prior Publication Data

US 2012/0114916 A1  May 10, 2012

Related U.S. Application Data

(60) Provisional application No. 61/410,584, filed on Nov. 5, 2010.

(51) Int. Cl.
*B32B 3/10* (2006.01)
*B32B 5/02* (2006.01)
*B32B 27/10* (2006.01)
(Continued)

(52) U.S. Cl.
CPC . *D21H 19/84* (2013.01); *B32B 3/10* (2013.01); *B32B 5/02* (2013.01); *B32B 27/10* (2013.01); *D21H 19/44* (2013.01); *D21H 19/54* (2013.01); *D21H 19/82* (2013.01); *D21H 21/16* (2013.01); *D21H 27/10* (2013.01); *Y10T 428/24851* (2015.01); *Y10T 428/266* (2015.01); *Y10T 428/277* (2015.01); *Y10T 428/31511* (2015.04); *Y10T 428/31551* (2015.04);
(Continued)

(58) Field of Classification Search
CPC .................. Y10T 428/24802; B41M 5/00
See application file for complete search history.

(56) References Cited

U.S. PATENT DOCUMENTS 1,904,576 A   4/1933   Twiss
2,054,116 A   9/1936   Abrams et al.
(Continued)

FOREIGN PATENT DOCUMENTS

CN   1099711     3/1995
CN   101378903   3/2009
(Continued)

OTHER PUBLICATIONS

Handbook for Pulp and Paper Technologists, G. A. Smook, 2nd Edition, 1992, pp. chap 15, pp. 220-227.
(Continued)

*Primary Examiner* — Gerard Higgins
*Assistant Examiner* — Sathavaram I Reddy
(74) *Attorney, Agent, or Firm* — Thomas W. Barnes, III

(57) ABSTRACT

An article in the form of recyclable packaging material having a water vapor transportation rate of about 500 g/m$^2$/day or less. The packaging material has a paper substrate of recyclable paper fibers and a print-receptive layer which is positioned over the outer surface of the paper substrate and has a Parker Print Smoothness value of about 1.5 or less. The packaging material also has a moisture barrier layer positioned over the print-receptive layer. The moisture barrier layer is formed from one or more energy-cured polymers. Also, methods for preparing these packaging materials, including printed packaging materials.

25 Claims, 2 Drawing Sheets

(51) Int. Cl.
*D21H 19/84* (2006.01)
*D21H 19/82* (2006.01)
*D21H 27/10* (2006.01)
*D21H 19/44* (2006.01)
*D21H 19/54* (2006.01)
*D21H 21/16* (2006.01)

(52) U.S. Cl.
CPC . *Y10T 428/31786* (2015.04); *Y10T 428/31935* (2015.04); *Y10T 428/31993* (2015.04)

(56) References Cited

U.S. PATENT DOCUMENTS

| | | | |
|---|---|---|---|
| 2,229,356 A | 1/1941 | Wiezevich | |
| 2,252,091 A | 8/1941 | Muller | |
| 2,258,434 A | 10/1941 | Abrams et al. | |
| 2,298,846 A | 10/1942 | Skooglund | |
| 3,196,038 A | 7/1965 | Schoch et al. | |
| 3,251,709 A | 5/1966 | Bonzagni | |
| 3,260,690 A | 7/1966 | Bohnert et al. | |
| 3,369,932 A | 2/1968 | Sawyer et al. | |
| 3,400,008 A | 9/1968 | Bleyle et al. | |
| 3,423,232 A | 1/1969 | Reinhard et al. | |
| 3,476,587 A | 11/1969 | Demol et al. | |
| 3,573,125 A | 3/1971 | Elliott | |
| 3,579,371 A | 5/1971 | Dooley et al. | |
| 3,674,621 A | 7/1972 | Miyamoto et al. | |
| 3,707,393 A | 12/1972 | McDonald | |
| 3,844,916 A | 10/1974 | Gaske | |
| 3,873,345 A | 3/1975 | Vreeland | |
| 3,874,905 A | 4/1975 | Knights | |
| 3,876,578 A | 4/1975 | Takada et al. | |
| 3,922,244 A | 11/1975 | Stephens et al. | |
| 3,924,023 A | 12/1975 | Boranian et al. | |
| 3,950,578 A | 4/1976 | Laumann | |
| 3,981,434 A | 9/1976 | Ramich | |
| 3,985,937 A | 10/1976 | Fife | |
| 4,010,307 A | 3/1977 | Canard et al. | |
| 4,070,262 A | 1/1978 | Guarino et al. | |
| 4,071,425 A | 1/1978 | Guarino et al. | |
| 4,072,592 A | 2/1978 | Due et al. | |
| 4,072,770 A | 2/1978 | Ting | |
| 4,117,199 A | 9/1978 | Gotoh et al. | |
| 4,133,909 A | 1/1979 | Spencer | |
| 4,227,979 A | 10/1980 | Humke et al. | |
| 4,241,142 A | 12/1980 | Kaliski et al. | |
| 4,248,939 A | 2/1981 | Parsons | |
| 4,265,969 A | 5/1981 | Yasuda et al. | |
| 4,301,210 A | 11/1981 | Yasuda et al. | |
| 4,311,766 A | 1/1982 | Mattor | |
| 4,326,006 A | 4/1982 | Kaminstein | |
| 4,360,147 A | 11/1982 | Brauner | |
| 4,421,825 A | 12/1983 | Seiter | |
| 4,460,647 A | 7/1984 | Keith | |
| 4,471,904 A | 9/1984 | Cassidy | |
| 4,496,583 A | 1/1985 | Yamamoto et al. | |
| 4,558,082 A | 12/1985 | Eckberg | |
| 4,637,859 A | 1/1987 | Trokham | |
| 4,714,727 A | 12/1987 | Hume, III | |
| 4,722,474 A | 2/1988 | Dropsy | |
| 4,782,626 A | 11/1988 | Shanley et al. | |
| 4,784,708 A | 11/1988 | Allen | |
| 4,844,262 A | 7/1989 | Patrick et al. | |
| 4,844,952 A | 7/1989 | Korenkiewicz et al. | |
| 4,857,126 A | 8/1989 | Soremark et al. | |
| 4,894,280 A | 1/1990 | Guthrie et al. | |
| 4,929,476 A | 5/1990 | Gibbons et al. | |
| 4,970,244 A | 11/1990 | Komai et al. | |
| 4,997,807 A | 3/1991 | Mukoyoshi et al. | |
| 5,034,281 A | 7/1991 | Kaji et al. | |
| 5,037,702 A | 8/1991 | Pitts et al. | |
| 5,047,270 A | 9/1991 | Mori et al. | |
| 5,093,306 A | 3/1992 | Mukoyoshi et al. | |
| 5,126,390 A | 6/1992 | Duff | |
| 5,162,389 A | 11/1992 | Lee et al. | |
| 5,169,715 A | 12/1992 | Maubert et al. | |
| 5,217,159 A | 6/1993 | Calvert et al. | |
| 5,217,765 A | 6/1993 | Parks | |
| 5,225,256 A | 7/1993 | Marano et al. | |
| 5,228,272 A | 7/1993 | Calvert et al. | |
| 5,250,353 A | 10/1993 | Bartholomew et al. | |
| 5,328,749 A | 7/1994 | Noda et al. | |
| 5,332,586 A | 7/1994 | Di Mino | |
| 5,356,858 A | 10/1994 | Yabuta et al. | |
| 5,358,790 A | 10/1994 | Ruf et al. | |
| 5,374,508 A | 12/1994 | Miura et al. | |
| 5,384,013 A | 1/1995 | Husband et al. | |
| 5,393,566 A | 2/1995 | Propst | |
| 5,436,073 A | 7/1995 | Williams et al. | |
| 5,492,733 A * | 2/1996 | D'Anna et al. | 427/517 |
| 5,499,764 A | 3/1996 | Carlsson | |
| 5,654,039 A | 8/1997 | Wenzel et al. | |
| 5,698,295 A | 12/1997 | Benner et al. | |
| 5,763,100 A | 6/1998 | Quick et al. | |
| 5,772,819 A | 6/1998 | Olvey | |
| 5,773,131 A | 6/1998 | Dettling | |
| 5,779,049 A | 7/1998 | Werby et al. | |
| 5,780,151 A | 7/1998 | Miller et al. | |
| 5,794,770 A | 8/1998 | Plomgren et al. | |
| 5,800,884 A | 9/1998 | D'Anna et al. | |
| 5,837,383 A | 11/1998 | Wenzel et al. | |
| 5,928,471 A | 7/1999 | Howland et al. | |
| 5,954,907 A | 9/1999 | LaRose et al. | |
| 5,981,011 A | 11/1999 | Overcash et al. | |
| 5,988,370 A | 11/1999 | Roemer et al. | |
| 5,989,651 A | 11/1999 | Sayers et al. | |
| 5,989,724 A | 11/1999 | Wittosch et al. | |
| 6,004,670 A | 12/1999 | Kobe et al. | |
| 6,073,760 A | 6/2000 | Roemer et al. | |
| 6,193,827 B1 | 2/2001 | Parks et al. | |
| 6,207,362 B1 | 3/2001 | Dagan et al. | |
| 6,284,072 B1 | 9/2001 | Ryan et al. | |
| 6,287,641 B1 | 9/2001 | Ostendorf et al. | |
| 6,436,540 B1 | 8/2002 | Garcia et al. | |
| 6,521,702 B1 | 2/2003 | Weikard et al. | |
| 6,548,120 B1 | 4/2003 | Wittosch et al. | |
| 6,603,054 B2 | 8/2003 | Chen et al. | |
| 6,645,616 B1 | 11/2003 | Sammarco et al. | |
| 6,660,362 B1 | 12/2003 | Lindsay et al. | |
| 6,669,814 B2 | 12/2003 | Hansen et al. | |
| 6,706,779 B2 | 3/2004 | Bahadur et al. | |
| 6,722,560 B2 | 4/2004 | Player et al. | |
| 6,803,392 B1 | 10/2004 | Kohler et al. | |
| 6,808,600 B2 | 10/2004 | Ross et al. | |
| 6,887,347 B2 | 5/2005 | Ponomarenko et al. | |
| 6,900,252 B2 | 5/2005 | Khudyakov et al. | |
| 6,960,639 B2 | 11/2005 | Weikard et al. | |
| 6,998,017 B2 | 2/2006 | Lindsay et al. | |
| 7,005,043 B2 | 2/2006 | Toney et al. | |
| 7,067,581 B2 | 6/2006 | Husemann et al. | |
| 7,135,508 B2 | 11/2006 | Chaiko et al. | |
| 7,153,892 B2 | 12/2006 | Ramsey | |
| 7,182,837 B2 | 2/2007 | Chen et al. | |
| 7,189,307 B2 | 3/2007 | Goulet et al. | |
| 7,235,308 B2 | 6/2007 | Druckrey et al. | |
| 7,238,732 B2 | 7/2007 | Bamborough et al. | |
| 7,279,506 B2 | 10/2007 | Sisler et al. | |
| 7,294,658 B2 | 11/2007 | Rea et al. | |
| 7,309,731 B2 | 12/2007 | Shih et al. | |
| 7,320,825 B2 | 1/2008 | Morabito | |
| 7,348,374 B2 | 3/2008 | Martinazzo | |
| 7,367,490 B2 | 5/2008 | Forthaus et al. | |
| 7,419,570 B2 | 9/2008 | Chen et al. | |
| 7,427,429 B2 | 9/2008 | Xing et al. | |
| 7,429,309 B2 | 9/2008 | Propst, Jr. et al. | |
| 7,435,312 B2 | 10/2008 | Lindsay et al. | |
| 7,449,085 B2 | 11/2008 | Hermans et al. | |
| 7,479,511 B2 | 1/2009 | Laksin et al. | |
| 7,491,433 B2 | 2/2009 | Bletsos et al. | |
| 7,574,166 B2 | 8/2009 | Murata et al. | |
| 7,612,122 B2 | 11/2009 | Herlihy | |
| 7,615,278 B2 | 11/2009 | Evers Smith et al. | |
| 7,625,462 B2 | 12/2009 | Liu et al. | |
| 7,638,462 B2 | 12/2009 | Kawamura et al. | |

(56) References Cited

U.S. PATENT DOCUMENTS

| | | |
|---|---|---|
| 7,641,947 B2 | 1/2010 | Chen et al. |
| 7,647,893 B2 | 1/2010 | Kraus |
| 7,678,228 B2 | 3/2010 | Goulet et al. |
| 7,700,663 B2 | 4/2010 | Flohr |
| 7,704,601 B2 | 4/2010 | Manifold et al. |
| 7,727,355 B2 | 6/2010 | Goto et al. |
| 7,758,785 B2 | 7/2010 | Gopal et al. |
| 7,846,553 B2 | 12/2010 | Peuramaki |
| 8,637,126 B2 | 1/2014 | Cleveland et al. |
| 2002/0028857 A1 | 3/2002 | Holy |
| 2002/0090508 A1 | 7/2002 | Nowak et al. |
| 2002/0122922 A1* | 9/2002 | Yamada ............... B41M 7/0054 428/204 |
| 2002/0160205 A1 | 10/2002 | Garcia et al. |
| 2002/0182376 A1* | 12/2002 | Mukherjee ............ B41M 5/506 428/32.24 |
| 2002/0192406 A1 | 12/2002 | Labbe et al. |
| 2003/0113567 A1 | 6/2003 | Nowak et al. |
| 2003/0135181 A1 | 7/2003 | Chen et al. |
| 2003/0143392 A1 | 7/2003 | Nowak et al. |
| 2003/0187120 A1 | 10/2003 | Chaiko et al. |
| 2003/0199218 A1 | 10/2003 | Mueller et al. |
| 2003/0207089 A1 | 11/2003 | Nakamura et al. |
| 2003/0219611 A1 | 11/2003 | Barcock et al. |
| 2003/0232211 A1 | 12/2003 | Kendall et al. |
| 2004/0006152 A1 | 1/2004 | Weikard et al. |
| 2004/0089433 A1 | 5/2004 | Propst, Jr. et al. |
| 2004/0099387 A1 | 5/2004 | Vinson et al. |
| 2004/0124234 A1 | 7/2004 | Forthaus et al. |
| 2004/0126546 A1 | 7/2004 | Davenport et al. |
| 2004/0234709 A1* | 11/2004 | Ishida et al. ............... 428/32.34 |
| 2004/0241352 A1 | 12/2004 | Shih et al. |
| 2004/0242758 A1 | 12/2004 | Shih et al. |
| 2005/0004309 A1 | 1/2005 | Gerst et al. |
| 2005/0041084 A1* | 2/2005 | Mukherjee et al. ............ 347/105 |
| 2005/0112387 A1 | 5/2005 | Druckrey et al. |
| 2005/0148759 A1 | 7/2005 | Mueller et al. |
| 2005/0234152 A1 | 10/2005 | Ramsey |
| 2005/0260428 A1* | 11/2005 | Song et al. ................ 428/537.5 |
| 2005/0280184 A1 | 12/2005 | Sayers et al. |
| 2006/0019567 A1 | 1/2006 | Sayers et al. |
| 2006/0030634 A1 | 2/2006 | Dean et al. |
| 2006/0062947 A1 | 3/2006 | Huffer et al. |
| 2006/0088697 A1 | 4/2006 | Manifold et al. |
| 2006/0169427 A1 | 8/2006 | Cartier |
| 2006/0191654 A1 | 8/2006 | Theisen et al. |
| 2006/0198987 A1 | 9/2006 | Grob et al. |
| 2007/0020462 A1 | 1/2007 | Rudolph et al. |
| 2007/0054117 A1 | 3/2007 | Katchko et al. |
| 2007/0054145 A1* | 3/2007 | Yokochi ............... D21H 19/40 428/537.5 |
| 2007/0071965 A1 | 3/2007 | Ramsey |
| 2007/0106017 A1 | 5/2007 | Kessel et al. |
| 2007/0116933 A1 | 5/2007 | Kobayashi et al. |
| 2007/0184206 A1 | 8/2007 | Draper |
| 2007/0184220 A1 | 8/2007 | Cleveland et al. |
| 2007/0218254 A1* | 9/2007 | Zhou et al. ................ 428/195.1 |
| 2007/0246180 A1 | 10/2007 | Liu |
| 2008/0013540 A1 | 1/2008 | Gast |
| 2008/0027154 A1 | 1/2008 | Ramsey |
| 2008/0070005 A1 | 3/2008 | Kobayashi et al. |
| 2008/0081135 A1 | 4/2008 | Spurrell |
| 2008/0081143 A1 | 4/2008 | Ukei et al. |
| 2008/0113861 A1* | 5/2008 | Watanabe ............ B41M 5/267 503/201 |
| 2008/0124499 A1* | 5/2008 | Sundvall et al. ............. 428/32.2 |
| 2008/0182080 A1 | 7/2008 | Kruger et al. |
| 2008/0190790 A1 | 8/2008 | Chandaria |
| 2008/0191001 A1 | 8/2008 | Chandaria |
| 2008/0220196 A1 | 9/2008 | Ukei et al. |
| 2008/0233316 A1 | 9/2008 | Fu et al. |
| 2008/0254303 A1 | 10/2008 | Ramsey |
| 2008/0268169 A1 | 10/2008 | Standing et al. |
| 2008/0277462 A1 | 11/2008 | Smorch et al. |
| 2008/0280113 A1 | 11/2008 | Iwatani et al. |
| 2008/0305349 A1 | 12/2008 | Nahm |
| 2009/0011191 A1 | 1/2009 | Saitou et al. |
| 2009/0020224 A1 | 1/2009 | Nowak et al. |
| 2009/0020249 A1 | 1/2009 | Propst, Jr. et al. |
| 2009/0047499 A1 | 2/2009 | Tilton |
| 2009/0142528 A1 | 6/2009 | Tilton |
| 2009/0218063 A1 | 9/2009 | Manifold et al. |
| 2009/0220741 A1 | 9/2009 | Manifold et al. |
| 2009/0220800 A1 | 9/2009 | Yokochi |
| 2009/0239020 A1 | 9/2009 | Schultz et al. |
| 2010/0040825 A1 | 2/2010 | Manifold et al. |
| 2010/0047534 A1 | 2/2010 | Jahromi et al. |
| 2010/0093241 A1 | 4/2010 | Medoff |
| 2010/0119735 A1 | 5/2010 | Faler et al. |
| 2010/0137493 A1 | 6/2010 | Tilton |
| 2010/0143681 A1 | 6/2010 | Yano et al. |
| 2010/0178440 A1 | 7/2010 | Jahromi et al. |
| 2011/0138753 A1 | 6/2011 | Justice et al. |
| 2012/0114917 A1 | 5/2012 | Anderson et al. |

FOREIGN PATENT DOCUMENTS

| | | |
|---|---|---|
| DE | 9301486 | 5/1993 |
| EP | 17364 | 10/1980 |
| EP | 393451 | 10/1990 |
| EP | 487497 | 5/1992 |
| EP | 0718437 | 6/1996 |
| EP | 0754800 | 1/1997 |
| EP | 1595718 | 8/2007 |
| JP | 7070982 | 3/1995 |
| RU | 2394008 | 7/2010 |
| WO | 9419172 | 9/1994 |
| WO | 9500399 | 1/1995 |
| WO | 9725477 | 7/1997 |
| WO | 0076862 | 12/2000 |
| WO | 02083503 | 10/2002 |
| WO | 03076185 | 9/2003 |
| WO | 2004037930 | 5/2004 |
| WO | 2005044469 | 5/2005 |
| WO | 2007040493 | 4/2007 |
| WO | 2008056035 | 5/2008 |
| WO | 2008057390 | 5/2008 |
| WO | 2008073426 | 6/2008 |
| WO | 2008148934 | 12/2008 |
| WO | 2009000562 | 12/2008 |
| WO | 2009043110 | 4/2009 |
| WO | 2009077536 | 6/2009 |
| WO | 2010012818 | 2/2010 |

OTHER PUBLICATIONS

Handbook for Pulp and Paper Technologists, G. A. Smook, 2nd Edition, 1992, pp. chap 17:p. 264-282, chap 18: p. 283-296, chap 19: p. 297-307, pp. 342 and 354.

Paper Paperboard Packaging Technology, Blackwell Publishing, 2005 pp. 317-371.

Aquabloc H, ADM Tronics Unlimited, Inc. 224-S Pegasus Ave., Northvale, NJ. (Jan. 1990).

Airflex 100 HS, Air Products and Chemicals, Inc., Allentown, PA. no date.

System 44, Michelman, Inc., 9080 Shell Road, Cincinnati, OH no date.

Adhesives and Coatings, Serfene 121, Morton Interantional Specialty Chemicals Grouop, 333 West Wacker Drive, Chicago, IL (Jan. 1991).

GeonHycar Good-Rite, AT 650.x 18 Latex, B.F. Goodrich, 9911 Brecksville Road, Cleveland, OH (Jan. 1990).

UNOCAL 76-RES 4105, Unocal Corporation, 1201 West Fifth Street, Los Angeles, CA (Jan. 1990).

Vaporcoat, Michelman, Inc. 9080 Shell Road, Cincinnati, OH no date.

Mobil Product Data Sheet, Mobil Oil Corporation, 3225 Gallows Road, Fairfax, VA (1991 no month).

ALCOGUM, Alco Chemical, 909 Mueller Drive, P.O. Box 5401, Chattanooga, TN (Oct. 27, 1992).

(56) References Cited

OTHER PUBLICATIONS

Utility of Latex Binders for Paperboard Coatings, Jan. 1992 Coated Paperboard Short Course, Rochester, NY Oct. 4-6, 1992, Davis et al., TAPPI Press, Technology Park, Atlanta, P.O. Box 105113, Atlanta, GA, pp. 97-99.

Foamaster R and Foamaster S Defoamers for Synthetic Latex Systems, Henkel Corporation, Coatings Inks Division, 300 Brookside Avenue, Ambler, PA (Jun. 1992).

Products for Paper and Paperboard Coatings (Rhoples: Polyco), Rohm and Hass Company, Philadelphia, PA May 1991.

Baracani, A Coat of Many Colors, American Printer, vol. 205(6) Sep. 1990, pp. 38-40.

Newes et al, A New Alkali Swellable Emulsion for Pigmented Paper and Paperboard Coatings, Resin Review, vol. 19, No. 1, May 1969, pp. 10-13.

Mobilcer, C, J, Q, RV, 136 Paper Industry Wax Emulsions, Mobil Product Data Sheet, Mobil Oil Corporation, Fairfax, VA 1986.

TMPTA Monomer, Uvecryl. RTM 7100 Ebecryl 3702 Specification Sheets from Radcure Specialties, Inc. 9800 E. Bluegrass Parkway, Louisville, KY (Feb. 1990).

SILWET Surfactant L 7602 Safety Data Sheet from Union Carbide Chemicals and Plastics Company, Inc., 39 Old Ridgebury Road, Danbury, CT (Jan. 30, 1990).

Unitex OB, Safety Data Sheet from Ciba-Geigy Corporation, 7 Skyline Drive, Hawthorne, NY (Jan. 5, 1991).

Handbook for Pulp and Paper Technologists, G. A. Smook, 2nd Edition, 1992, pp. 273-278, 296-298, 289-292, 283-285, 354, 342, 278-282.

UV-Curable Water-soluable Epoxy Acrylic Resin, Bai Ziangyun Zhong hui Jin Yangzhi (Beijing University of Chemcial and Technology Beijing 100029) Magnetic Recording Materials 2000-03.

Recyclability of UV and EB Printed and Coated Paper; David J. Korn, May/Jun. 2005 p. 47, RadTech Report.

* cited by examiner

PACKAGING MATERIAL HAVING MOISTURE BARRIER AND METHODS FOR PREPARING SAME

CROSS-REFERENCE TO RELATED APPLICATIONS

This application claims the priority benefit of U.S. Provisional Application Ser. No. 61/410,584, filed Nov. 5, 2010. The entire disclosure and contents of the foregoing provisional application is hereby incorporated by reference.

FIELD OF THE INVENTION

The present invention broadly relates to a recyclable packaging material comprising a paper substrate; a print-receptive layer which is positioned over the outer surface of the paper substrate; and a moisture barrier layer which comprises one or more energy-cured polymers and which is positioned over the print-receptive layer. The present invention also broadly relates to a method for preparing these recyclable packaging materials by applying an energy-curable coating comprising one or more energy-curable monomers over the calendered print-receptive layer; and curing the energy-curable monomers to form a moisture barrier layer positioned over the calendered print-receptive layer and comprising one or more energy-cured polymers. The present invention further broadly relates to a method for preparing printed packaging materials by providing a printable material having a print-receptive layer; depositing print colorant on the print-receptive to form one or more printed areas; applying the energy-curable coating comprising one or more energy-curable monomers over the print-receptive layer of the printed material to provide a coated printed material; and curing the energy-curable monomers to form a moisture barrier layer comprising one or more energy-cured polymers and positioned over the print-receptive layer of the printed material to provide a printed packaging material, wherein the printing, applying and curing steps are carried out as a single pass operation, and without reeling up: the printed material prior to the applying step; and the coated printed material prior to the curing step.

BACKGROUND

Polyethylene films, which may be laminated or coated on paper, are widely used in packaging applications to protect products from moisture and provide water or grease resistance. Conventional ream wraps may be a multi-ply product having a ply of polyethylene adjacent at least one surface of a paper substrate, or having a center ply of polyethylene in between two other plys of a paper substrate. The polyethylene ply may be used in ream wraps to provide an effective barrier to water vapor (humidity). This water vapor (humidity) may cause the wrapped paper to curl, resulting in misfeeds and jams in copy machines or printing presses. Other paper coatings which comprise wax have also been used. For example, U.S. Pat. No. 4,117,199 (Gotoh et al.), issued Sep. 26, 1978, discloses a repulpable coated paper containing a synthetic rubber latex and a wax emulsion. Coatings such as Vapo-Stop, manufactured by Cham-Tenero Paper Mills, Inc., Cham, Switzerland, include a styrene-butadiene polymer, wax and acrylic polymer components which may provide moisture resistance to coated paper substrates.

SUMMARY

According to a first broad aspect of the present invention, there is provided an article comprising a recyclable packaging material comprising:
  a paper substrate comprising at least about 40% recyclable paper fibers and having an inner surface and an outer surface;
  a print-receptive layer having an inner surface and an outer surface, wherein the print-receptive layer inner surface is positioned over the paper substrate outer surface and wherein the print-receptive layer outer surface has a Parker Print Smoothness value of about 1.5 or less; and
  a moisture barrier layer comprising one or more energy-cured polymers positioned over the print-receptive layer outer surface, wherein the packaging material has a water vapor transportation rate of about 500 g/m$^2$/day or less.

According to a second broad aspect of the present invention, there is provided a method comprising the following steps:
  (a) providing a calendared printable material comprising:
    a paper substrate comprising at least about 40% recyclable paper fibers and having an outer surface and inner surface; and
    a print-receptive layer having an inner surface and a calendered outer surface, wherein the print-receptive layer inner surface is positioned over the paper substrate outer surface and wherein the calendered print-receptive layer outer surface has a Parker Print Smoothness value of about 1.5 or less;
  (b) applying an energy-curable coating comprising one or more energy-curable monomers over the calendered print-receptive layer outer surface; and
  (c) curing the energy-curable monomers to form a moisture barrier layer comprising one or more recyclable energy-cured polymers positioned over the calendered print-receptive layer outer surface to provide a recyclable packaging material having a water vapor transportation rate of about 500 g/m$^2$/day or less.

According to a third broad aspect of the present invention, there is provided a method comprising the following steps:
  (a) providing an unreeled printable material comprising:
    a paper substrate having an outer surface and inner surface; and
    a print-receptive layer having an inner surface and an outer surface, wherein the print-receptive layer inner surface is positioned over the paper substrate outer surface and wherein the print-receptive layer outer surface has a Parker Print Smoothness value of about 1.5 or less;
  (b) depositing print colorant on the print-receptive layer outer surface to form one or more printed areas to provide a printed material;
  (c) applying to the printed material an energy-curable coating comprising one or more energy-curable monomers over the print-receptive layer outer surface, including the printed areas, to provide a coated printed material; and
  (d) curing the energy-curable monomers to form a moisture barrier layer comprising one or more energy-cured polymers positioned over the print-receptive layer outer surface to provide a printed packaging material having a water vapor transportation rate of about 500 g/m$^2$/day or less;
  wherein steps (a) through (d) are carried out as a single pass operation, and without reeling up: the printed material of step (b) prior to carrying step (c); and the coated printed material of step (c) prior to carrying out step (d).

BRIEF DESCRIPTION OF THE DRAWINGS

The invention will be described in conjunction with the accompanying drawings, in which.

DETAILED DESCRIPTION

Figure 1:
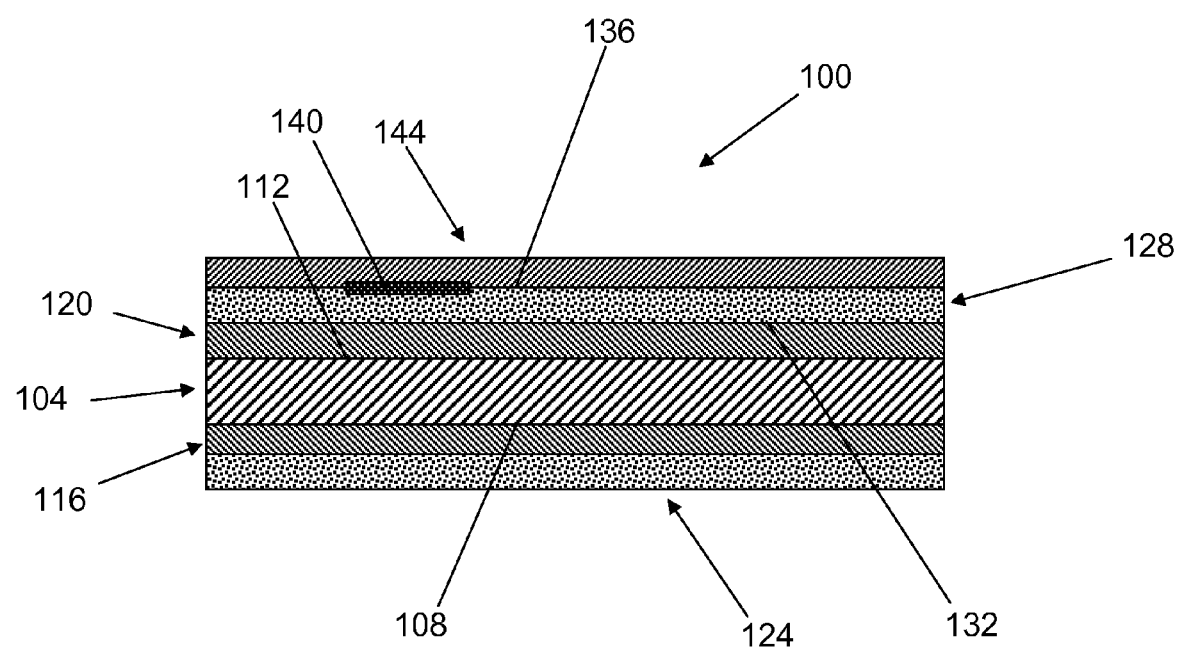
FIG. 1 is a side sectional view of an embodiment of a recyclable printable packaging material of the present invention.

It is advantageous to define several terms before describing the invention. It should be appreciated that the following definitions are used throughout this application.

DEFINITIONS

Where the definition of terms departs from the commonly used meaning of the term, applicant intends to utilize the definitions provided below, unless specifically indicated.

For the purposes of the present invention, directional terms such as "outer," "inner," "upper," "lower," "top", "bottom", "side," "front," "frontal," "forward," "read," "rearward," "back," "trailing," "above", "below", "left", "right", "horizontal", "vertical", "upward", "downward", etc. are merely used for convenience in describing the various embodiments of the present invention. For example, the embodiments of the present invention illustrated in FIGS. 1 and 2, may be oriented in various ways.

For the purposes of the present invention, the term "packaging material" refers to materials for forming packages for protecting, carrying, distributing, etc., products, such as a ream of paper, paper rolls, foods, beverages, etc. Packaging material may include, for example, ream wrap, roll wrap, envelopes, containers (e.g., for foods or beverages), boxes, etc.

For the purposes of the present invention, the term "ream wrap" refers to packaging material used to protect, carry, distribute, etc., a ream of paper.

For the purposes of the present invention, the term "roll wrap" refers to packaging material used to protect, carry, distribute, etc., one or more rolls of paper.

For the purposes of the present invention, the term "ream of paper" refers to the conventional sense of the term as providing a quantity of paper (e.g., packaged quantity of paper) in the range of, for example, from about 480 to about 516 sheets (e.g., 480, 500 or 516 sheets).

For the purposes of the present invention, the term "paper substrate" refers to a fibrous web that may be formed, created, produced, etc., from a mixture, furnish, etc., comprising paper fibers, etc., plus any other optional papermaking additives such as, for example, internal and/or external paper sizing agents, fillers, wet-strength agents, optical brightening agents, etc. The paper substrate may be in the form of a continuous roll, a discrete sheet, etc.

For the purposes of the present invention, the term "softwood fibers" refers to fibrous pulps derived from the woody substance of coniferous trees (gymnosperms) such as varieties of fir, spruce, pine, etc., for example, loblolly pine, slash pine, Colorado spruce, balsam fir, Douglas fir, jack pine, radiata pine, white spruce, lodgepole pine, redwood, etc. North American southern softwoods and northern softwoods may be used to provide softwood fibers, as well as softwoods from other regions of the world.

For the purposes of the present invention, the term "hardwood fibers" refers to fibrous pulps derived from the woody substance of deciduous trees (angiosperms) such as birch, oak, beech, maple, eucalyptus, poplars, etc.

For the purposes of the present invention, the term "paper substrate filler" refers to mineral products (e.g., calcium carbonate, kaolin clay, etc.), as well as nonmineral products (e.g., plastic pigments), which may be used in paper making to reduce materials cost per unit mass of the paper, increase opacity, increase smoothness, etc. The mineral products may be finely divided, for example, the size range of from about 0.5 to about 5 microns.

For the purposes of the present invention, the term "calendered material" refers to a material which has been subjected to calendering to, for example, smooth out the material for enabling printing on the material, to increase the gloss on the material surface, etc. For example, calendering may involve a process of using pressure (and optionally temperature and moisture) for embossing a smooth surface on the still rough material surface. Calendering may be carried out on a calender which may comprise a series of calender rolls at the end of, for example, a papermaking machine (on-line), or separate from the papermaking machine (off-line). Calendering may include supercalendering, hot-soft calendering, moisture-gradient calendering, extended nit calendering, belt calendering, etc. See G. A. Smook, Handbook for Pulp and Paper Technologists ($2^{nd}$ Edition, 1992), pages 273-78, the entire contents and disclosure of which is herein incorporated by reference, for a general description of calendering, as well as devices for carrying out calendering, that may be useful herein.

For the purposes of the present invention, the term "supercalendered material" refers to a material which has been processed (calendered) through an alternating series of harder surface (e.g., steel, etc.) and softer surface (e.g., fiber-covered, polymer covered, etc.) calender rolls. See G. A. Smook, Handbook for Pulp and Paper Technologists ($2^{nd}$ Edition, 1992), pages 296-98, the entire contents and disclosure of which is herein incorporated by reference, for a general description of supercalendering, as well as devices for carrying out supercalendering, that may be useful herein.

For the purposes of the present invention, the term "energy-curable coating" refers to those coatings, which comprise, at minimum, one or more energy-cured polymers, one more energy-curable monomers for forming the energy-cured polymers, etc. These energy-curable coatings (or energy-curable coating compositions used to provide such coatings) may also include other optional additives, such as, for example, solvents, diluents, rheology modifiers, dispersants, surfactants, etc. The energy-curable coating compositions may be formulated as an aqueous solution, an aqueous slurry, a colloidal suspension, a liquid mixture, a thixotropic mixture, etc.

For the purposes of the present invention, the term "solids basis" refers to the weight percentage of each of the respective solid materials (e.g., energy-cured polymers, energy-curable monomers, etc.) present in the coating, coating composition, etc., in the absence of any liquids (e.g., water, other solvents, etc.). Unless otherwise specified, all percentages given herein for the solid materials are on a solids basis.

For the purposes of the present invention, the term "solids content" refers to the percentage of non-volatile, non-liquid components (by weight) that are present in the coating, composition, etc.

For the purposes of the present invention, the term "substrate pigment" refers to a material (e.g., a finely divided particulate matter) which may be used or may be intended to be used to affect optical properties of a paper substrate. Substrate pigments may include calcium carbonate pigments, absorptive plastic pigments, clay pigments, kaolin pigments, calcined clay pigments, talc pigments, titanium dioxide pigments, barium sulfate pigments, silica pigments, zeolite pigments, etc. Substrate pigments may also be platy mineral pigments, non-platy mineral pigments, etc.

For the purposes of the present invention, the term "platy mineral pigment" refers to substrate pigments which are plate-like in structure and consist of thin, ill formed, sheet-like particles of high aspect ratio (width to thickness of the particles) of greater than about 2, for example, greater than about 5, such as in the range of from about 10 to about 60 (e.g., from about 20 to about 40). Platy mineral pigments may include one or more of: delaminated clays, kaolin, talc, montmorillonite, halloysite, attapulgite, illite, natural and synthetic micas, such as muscovite, phlogopite, biotite, barium disilic, etc. See commonly-assigned U.S. Pat. No. 7,320,825 (Morabito), issued Jan. 22, 2008, the entire contents and disclosure of which is herein incorporated by reference, for description of platy mineral pigments, and the difference from non-platy mineral pigments.

For the purposes of the present invention, the term "calcium carbonate" refers various calcium carbonates which may be used as substrate pigments, such as precipitated calcium carbonate (PCC), ground calcium carbonate (GCC), modified PCC and/or GCC, etc.

For the purposes of the present invention, the term "precipitated calcium carbonate (PCC)" refers to a calcium carbonate which may be manufactured by a precipitation reaction and which may used as a substrate pigment. PCC may comprise almost entirely of the calcite crystal form of $CaCO_3$. The calcite crystal may have several different macroscopic shapes depending on the conditions of production. Precipitated calcium carbonates may be prepared by the carbonation, with carbon dioxide ($CO_2$) gas, of an aqueous slurry of calcium hydroxide ("milk of lime"). The starting material for obtaining PCC may comprise limestone, but may also be calcined (i.e., heated to drive off $CO_2$), thus producing burnt lime, CaO. Water may added to "slake" the lime, with the resulting "milk of lime," a suspension of $Ca(OH)_2$, being then exposed to bubbles of $CO_2$ gas. Cool temperatures during addition of the $CO_2$ tend to produce rhombohedral (blocky) PCC particles. Warmer temperatures during addition of the $CO_2$ tend to produce scalenohedral (rosette-shaped) PCC particles. In either case, the end the reaction occurs at an optimum pH where the milk of lime has been effectively converted to $CaCO_3$, and before the concentration of $CO_2$ becomes high enough to acidify the suspension and cause some of it to redissolve. In cases where the PCC is not continuously agitated or stored for many days, it may be necessary to add more than a trace of such anionic dispersants as polyphosphates. Wet PCC may have a weak cationic colloidal charge. By contrast, dried PCC may be similar to most ground $CaCO_3$ products in having a negative charge, depending on whether dispersants have been used. The calcium carbonate may be precipitated from an aqueous solution in three different crystal forms: the vaterite form which is thermodynamically unstable, the calcite form which is the most stable and the most abundant in nature, and the aragonite form which is metastable under normal ambient conditions of temperature and pressure, but which may convert to calcite at elevated temperatures. The aragonite form has an orthorhombic shape that crystallizes as long, thin needles that may be either aggregated or unaggregated. The calcite form may exist in several different shapes of which the most commonly found are the rhombohedral shape having crystals that may be either aggregated or unaggregated and the scalenohedral shape having crystals that are generally unaggregated.

For the purposes of the present invention, the term "substrate pigment binder" refers to a binder agent for paper substrates which may be used to improve the substrate pigment binding strength of the coating composition, coating, etc. Substrate pigment binders may be hydrophilic. Suitable substrate pigment binders may include synthetic or naturally occurring polymers (or a combination of different polymers), for example, a polyvinyl alcohol (PVOH), starch binders, proteinaceous adhesives such as, for example, casein or soy proteins, etc.; polymer latexes such as styrene butadiene rubber latexes, acrylic polymer latexes, polyvinyl acetate latexes, styrene acrylic copolymer latexes, etc., or a combination thereof.

For the purposes of the present invention, the term "starch binder" refers to a binder agent for substrate pigments and/or paper substrates which comprises starch, a starch derivative, etc., or a combination thereof. Suitable starch binders may be derived from a natural starch, e.g., natural starch obtained from a known plant source, for example, wheat, maize, potato, tapioca, etc. The starch binder may be modified (i.e., a modified starch) by one or more chemical treatments known in the paper starch binder art, for example, by oxidation to convert some of —$CH_2OH$ groups to —COOH groups, etc. In some cases the starch binder may have a small proportion of acetyl groups. Alternatively, the starch binder may be chemically treated to render it cationic (i.e., a cationic starch) or amphoteric (i.e., an amphoteric starch), i.e., with both cationic and anionic charges. The starch binder may also be a starch converted to a starch ether, or a hydroxyalkylated starch by replacing some —OH groups with, for example, —$OCH_2CH_2OH$ groups, —$OCH2CH_3$ groups, —$OCH_2CH_2CH_2OH$ groups, etc. A further class of chemically treated starch binders which may be used are known as the starch phosphates. Alternatively, raw starch may be hydrolyzed by means of a dilute acid, an enzyme, etc., to produce a starch binder in the form of a gum of the dextrin type.

For the purpose of the present invention, the term "applying" with reference to the coatings, and compositions used to provide such coatings, may include adding, depositing, spraying, daubing, spreading, wiping, dabbing, dipping, printing, etc.

For the purposes of the present invention, the term "surface coverage" refers to amount of a coating, or composition used to provide such coatings, present on a given side or surface of the paper substrate or layer being coated. Surface coverage may be defined in terms of grams (of solids) of composition per square meter of paper substrate or layer (hereinafter referred to as "gsm").

For the purposes of the present invention, the term "coater" refers to a device, equipment, machine, etc., which may be used to apply, print, etc., the coating, or composition used to provide such coatings, to one or more surfaces of a paper substrate or layer. Coaters may include air-knife coaters, rod coaters, blade coaters, size presses, flexographic printers, other printers, etc. See G. A. Smook, Handbook for Pulp and Paper Technologists ($2^{nd}$ Edition, 1992), pages 289-92, the entire contents and disclosure of which is herein incorporated by reference, for a general description of coaters that may be useful herein. Size presses may include a puddle size press, a metering size press, etc. See G. A. Smook, Handbook for Pulp and Paper Technologists ($2^{nd}$ Edition, 1992), pages 283-85, the entire contents and disclosure of which is herein incorporated by reference, for a general description of size presses that may be useful herein.

For the purposes of the present invention, the term "opacity" refers to the ability of a paper substrate to hide things such as print images on subsequent sheets or printed on the back, e.g., to minimize, prevent, etc., show-through, etc. As used herein, opacity of the paper substrate may be measured by, for example, in terms of TAPPI opacity and show-through. TAPPI opacity may be measured by T425 om-91.

For the purposes of the present invention, the term "Parker Print Smoothness" refers to the extent to which the paper surface deviates from a planar or substantially planar surface, as affected by the depth of the paper, paper width, numbers of departure from that planar surface, etc., as measured by TAPPI test method T 555 om-99 at a clamping pressure of 10 kgf/cm$^2$. Parker Print Smoothness values reflect the degree of "microroughness" of the substrate or coating surface. The higher the Parker Print Smoothness value, the rougher the substrate, layer, or coating surface. Conversely, the lower Parker Print Smoothness value, the smoother the substrate, layer, or coating surface.

For the purposes of the present invention, the term "gloss" refers to the ability of paper to reflect some portion of the incident light at the mirror angle. Gloss may be based on a measurement of the quantity of light specularly reflected from the surface of a paper specimen at a set angle, for example, at 75 degrees, such as in the case of 75 degree gloss (and as measured by TAPPI test method T 480 om-92).

For the purposes of the present invention, the term "print gloss" refers to a gloss measurement made on a printed paper substrate.

For the purposes of the present invention, the term "digital printing" refers to reproducing, forming, creating, providing, etc., digital images on a printable material, such as paper substrate having a print-receptive layer. Digital printing may include laser printing, ink jet printing, etc.

For the purposes of the present invention, the term "laser printing" refers to a digital printing technology, method, device, etc., that may use a laser beam to create, form produce, etc., a latent image on, for example, photoconductor drum. The light of laser beam may later create charge on the drum which may then pick up toner which carries an opposite charge. This toner may then be transferred to the printable material, such as paper substrate having a print-receptive layer, and the resulting print image created, formed, produced, etc., fused to the printable material through, for example, a fuser.

For the purposes of the present invention, the term "electrophotographic recording process" refers to a process which records images on a printable material, such as paper substrate having a print-receptive layer, by xerography or electrophotography. In an electrophotographic process, the image is often formed on of the c by toner particles which are deposited one surface or side of the printable substrate, and are then thermally fixed and/or fused to that one surface or side of the printable material, for example, by heating.

For the purposes of the present invention, the term "ink jet printing" refers to a digital printing technology, method, device, etc., that may form images on a printable material, such as paper substrate having a print-receptive layer, by spraying, jetting, etc., tiny droplets of liquid inks onto the printable material through the printer nozzles. The size (e.g., smaller size), precise placement, etc., of the ink droplets may be provide higher quality inkjet prints. Ink jet printing may include continuous ink jet printing, drop-on-demand ink jet printing, etc.

For the purposes of the present invention, the term "liquid" refers to a non-gaseous fluid composition, compound, material, etc., which may be readily flowable at the temperature of use (e.g., room temperature) with little or no tendency to disperse and with a relatively high compressibility.

For the purposes of the present invention, the term "viscosity," with reference to energy-curable coatings applied by, for example, flexographic printing, refers to a viscosity measured by the Zahn cup test, using a #2 Zahn cup. To determine the viscosity of a liquid substance by the Zahn cup test, the Zahn cup is dipped and completely filled with the substance. After lifting the Zahn cup out of the substance, the time (in seconds) until the liquid streaming out of cup breaks up is measured (referred to as the "efflux time").

For the purpose of the present invention, the term "printer" refers to any device which prints an image on a printable material, such as a paper substrate having a print-receptive layer, including laser printers, inkjet printers, flexographic printers, electrophotographic recording devices (e.g., copiers), scanners, fax machines, etc.

For the purpose of the present invention, the term "print colorant" refers to any material which may form, create, etc., print images. Print colorants may include ink (as used by, for example, an inkjet printer, flexographic printer, etc.), toner (as used by, for example, a laser printer, electrographic recording device, etc.), etc.

For the purpose of the present invention, the term "ink" refers to printer colorant as used by ink jet printers, flexographic printers, etc. The term ink may include dye-based inks and/or pigment-based inks. Dye-based inks comprise a dye which may be an organic molecule which is soluble in the ink medium. Dye-based inks may be classified by their usage, such as acid dyes, basic dyes, or direct dyes, or by their chemical structure, such as azo dyes, which are based on the based on an —N=N— azo structure; diazonium dyes, based on diazonium salts; quinone-imine dyes, which are derivates of quinine, etc. Pigment-based dyes comprise a pigment, which is a solid colored particle suspended in the ink medium. The particle may comprise a colored mineral, a precipitated dye, a precipitated dye which is attached to a carrier particle, etc. Inks are often dispensed, deposited, sprayed, etc., on a printable material (e.g., ink-receptive layer) in the form of droplets which then dry on the printable material to form the printed image(s).

For the purpose of the present invention, the term "toner" refers to printer pigment as used by laser printers. Toner is often dispensed, deposited, etc., on the printable material, such as paper substrate having a print-receptive layer, in the form of particles, with the particles then being fused on the printable material to form the image.

For the purposes of the present invention, the term "room temperature" refers to the commonly accepted meaning of room temperature, i.e., an ambient temperature of 20° to 25° C.

For the purpose of the present invention, the term "print-receptive layer" refers to a layer which is able to absorb, imbibe, take up, accept, etc., deposited print colorant to form one or more printed images. Print-receptive layers may include ink-receptive layers (e.g., those layers able to receive, absorb, imbibe, take up, accept, etc., deposited ink) and toner-receptive layers (e.g. those layers able to receive, accept, etc., deposited toner). The print-receptive layer may comprise, for example, one or more substrate pigments (e.g., clay, titanium dioxide, calcium carbonate, calcined clay, etc.), starch binder, latex binder, a lubricant (e.g., calcium stearate), optical brightening agents, fluorocarbon-containing compounds, etc. See commonly-assigned U.S. Published Appln. No. 20090239020 (Schultz et al.), published Sep. 24, 2009, the entire contents and disclosure of which is herein incorporated by reference, which describes a coating layer 3 which may be used as an embodiment of the print-receptive layer. See also commonly-assigned U.S. Published Appln. No. 20070020462 (Rudolph et al.), published Jan. 25, 2007, the entire contents and disclosure of which is herein incorporated by reference, which describes coating layer which may optionally contain a fluorocarbon-containing compound which may also be used as an embodiment of the print-receptive layer.

For the purposes of the present invention, the term "printed area" refers to any area of the print-receptive layer comprising one or more printed images created as a result of print colorant being deposited on the print-receptive layer.

For the purposes of the present invention, the term "moisture barrier layer" refers to a layer that is protective against environmental moisture, i.e., has a relatively low water vapor transmission rate, especially in environments having a relatively high relative humidity (RH) (e.g., about 65% or greater, more typically about 80% or greater), and may comprise one or more layers.

For the purposes of the present invention, the term "relative humidity" (RH) refers to the percentage relation between the actual amount of water vapor in a given volume of air at a definite temperature and the maximum amount of water vapor that would be present if the air environment were saturated with water vapor at that temperature. RH is typically measured herein at temperatures of about 90° F.

For the purposes of the present invention, the term "water vapor transmission rate" (WVTR) refers to the rate at which water vapor or moisture passes through or is transmitted through a material, layer, substrate, etc., in units of g/m²/day. One method that is used herein to define WVTR is by TAPPI method T464 om-90 (but measured at 90° F. and 80% RH).

For the purposes of the present invention, the terms "flexography" and "flexographic" (also referred to as "flexo") refer to a form, technique, method, etc., of printing that uses a flexible relief plate. Flexographic methods also use a specially designed or engraved roller (anilox roller) having a surface containing a plurality of recessed dimples or cells for receiving and transferring the printable material to the printed substrate. Flexographic methods may use highly fluid printable materials (e.g., water-based inks), specially designed polymer relief printing plates, and light pressure in the printing nip area. See G. A. Smook, Handbook for Pulp and Paper Technologists (2$^{nd}$ Edition, 1992), page 354, the entire contents and disclosure of which is herein incorporated by reference, for a general description of flexographic printing and machines/components for carrying out flexographic printing.

For the purposes of the present invention, the term "energy-curable" refers to compositions, compounds, substances, materials, etc., which may be curable (e.g., polymerizable, crosslinkable, etc.) to a solid or near-solid by exposure to energy from a radiant or thermal energy source, such as thermally-curable, electron beam-curable (i.e., by exposure to high energy electrons from an electron beam source), photoinitiated-curable (e.g., by exposure to UV radiation, actinic radiation, etc.), etc.

For the purposes of the present invention, the term "energy-curable monomers" refers monomers, oligomers, etc., which are energy-curable (e.g., polymerizable, crosslinkable, etc.) to provide (recyclable) energy-cured polymers. Energy-curable monomers may include, for example, one or more of: dipropylene glycol diacrylate; tripropylene glycol diacrylate; butanediol diacrylate; hexanediol diacrylate; alkoxylated hexanediol diacrylate; trimethyol propane triacrylate; alkoxylated trimethylol propane triacrylate; di(trimethylol propane triacrylate); glycerolpropoxy triacrylate; pentaerythritrol triacrylate; alkoxylated pentaerythritrol triacrylate; di(pentaerythritrol triacrylate); neopentaglycol diacrylate; alkoxylated neopentaglycol diacrylate; dipropylene glycol dimethacrylate; tripropylene glycol dimethacrylate; butanediol dimethacrylate; hexanediol dimethacrylate; alkoxylated hexanediol dimethacrylate; trimethyol propane trimethacrylate; alkoxylated trimethylol propane trimethacrylate; di(trimethylol propane methtriacrylate); glycerolpropoxy trimethacrylate; pentaerythritrol trimethacrylate; alkoxylated pentaerythritrol trimethacrylate; di(pentaerythritrol trimethacrylate); neopentaglycol dimethacrylate; alkoxylated neopentaglycoldimethacrylate; acrylated epoxy resins; bis acrylic esters of bisphenol A (such as di-(3-methacryloxy-2-hydroxypropyl ether of bisphenol-A; di(2-methacryloxyethyl ether of bisphenol-A; di-(3-acryloxy-2-hydroxypropyl ether of bisphenol-A; di(2-acryloxyethyl ether of bisphenol-A, etc.); acrylated polyurethanes; acrylated polyesters; acrylated polyethers, etc, disclosed in, for example, U.S. Pat. No. 7,479,511 (Laksin et al.), issued Jan. 20, 2009; U.S. Pat. No. 7,612,122 (Herlihy), issued Nov. 3, 2009, the entire contents and disclosure of which are herein incorporated by reference. Energy-curable monomers may also include, for example, one or more of: urethane acrylates, aliphatic urethane acrylates, aliphatic urethane triacrylate/monomer blends, aliphatic urethane triacrylates blended with 1,6-hexanediol acrylates, hexafunctional urethane acrylates, siliconized urethane acrylates, aliphatic siliconized urethane acrylates, polyether acrylates, trimethylolpropane triacrylates, 2-phenoxyethyl acrylates, isobornyl acrylates, propoxylated glyceryl triacrylates, acrylate ester derivatives, methacrylate ester derivatives, acrylate ester derivatives, tripropylene glycol diacrylate, etc., disclosed in U.S. Published Appln. No. 20050234152 (Ramsey), published Oct. 20, 2005; U.S. Published Appln. No. 20080027154 (Ramsey), published Jan. 31, 2008; U.S. Published Appln. No. 20080254303 (Ramsey), published Oct. 16, 2008, the entire contents and disclosure of which are herein incorporated by reference.

For the purposes of the present invention, the term "energy-cured polymers" refers to polymers (other than polyethylene) obtained by curing (e.g., polymerizing, crosslinking, etc.) energy-curable monomers. See, for example, U.S. Pat. No. 7,479,511 (Laksin et al.), issued Jan. 20, 2009; U.S. Pat. No. 7,612,122 (Herlihy), issued Nov. 3, 2009; U.S. Published Appln. No. 20050234152 (Ramsey), published Oct. 20, 2005; U.S. Published Appln. No. 20080027154 (Ramsey), published Jan. 31, 2008; U.S. Published Appln. No. 20080254303 (Ramsey), published Oct. 16, 2008, the entire contents and disclosure of which are herein incorporated by reference, which describe illustrative methods for converting energy-curable monomers to energy-cured polymers. In some embodiments of the recyclable packaging materials, these energy-cured polymers, even if not themselves recyclable, should be compatible with the recyclability of these packaging materials, i.e., do not impede, inhibit, obstruct, block, hamper, hinder, decrease, prevent, etc., the recyclability (e.g., repulpability) of these packaging materials.

For the purposes of the present invention, the term "recyclable" refers to refers to compositions, compounds, substances, materials, paper substrates, etc., which may be reused as is or after reprocessing (e.g., composting, other chemical processing, etc.) in preparing new compositions, compounds, substances, materials, paper substrates, etc. The term "recyclable" includes the term "repulpable."

For the purposes of the present invention, the term "repulpable" refers to compositions, compounds, substances, materials, paper substrates, etc., (e.g., paper fibers, etc.) which may be reused as is or after reprocessing (e.g., composting, other chemical processing, etc.) in papermaking.

For the purposes of the present invention, the term "brightness gain per yield loss" refers to a method for evaluating how effectively and efficiently compositions, compounds, substances, materials, paper substrates, etc., may be repulped and processed for recovery of, for example, paper fibers, in terms of increasing the brightness of the repulped material (e.g., paper fibers), versus the mass (yield) loss of the repulped/recovered material. This method, which uses a "flotation test" to evaluate the increased brightness of the repulped/recovered material, versus the yield loss of the repulped/recovered material. See Procedure for Determining Brightness Gain Per Yield Loss for Repulped/Recovered Materials (Flotation Test) section below for how to carry out a "flotation test" for determining the efficiency and effectiveness of repulped/recovered materials in terms of brightness gain per yield loss. A brightness gain per yield loss value of at least about 0.3, such as at least about 0.5, is considered herein to indicate materials which may be efficiently and effectively repulped and recovered.

For the purposes of the present invention, the term "basis weight" refers to the grammage of a sheet, roll, etc., of material comprising the paper substrate, with or without layers or coatings, as determined by TAPPI test T410. See G. A. Smook, Handbook for Pulp and Paper Technologists ($2^{nd}$ Edition, 1992), page 342, Table 22-11, the entire contents and disclosure of which is herein incorporated by reference, which describes the physical test for measuring basis weight.

For the purposes of the present invention, the term "caliper," refers to the thickness of a sheet, web, etc., of a material, for example, a material comprising the paper substrate, with or without layers or coatings, before or after calendaring, in mils, as determined by measuring the distance between smooth, flat plates at a defined pressure.

For the purposes of the present invention, the term "mil(s)" is used in the conventional sense of referring to thousandths of an inch.

For the purposes of the present invention, the term "reeling" refers to the process of rolling up, winding, collecting, etc., a material into a rolled (wound) form. Conversely, the term "unreeling" refers to unrolling, unwinding, dispensing, etc., a material into an unrolled (unwound) form. See G. A. Smook, Handbook for Pulp and Paper Technologists ($2^{nd}$ Edition, 1992), pages 278-82, the entire contents and disclosure of which is herein incorporated by reference, for a general description of reeling/winding materials (e.g., paper), as well as devices for carrying out reeling/winding of materials.

For the purposes of the present invention, the term "single pass operation" refers to an operation (in some embodiments of the method of the present invention) wherein at least the step of providing an unreeled printable material through at least the step of curing the energy-curable monomers to form a moisture barrier layer to provide a printed packaging material, are carried out continuously in one pass through the operation (i.e., through the machinery, apparatus, devices, etc., used to carry out these steps), as opposed to multiple passes (i.e., two or more passes) through the operation, and without reeling up/unreeling: the printed material prior to the step of applying the energy-curable coating; and the coated printed material prior to step of curing the energy-curable monomers. If specified in certain embodiments of the method of the present invention, a single step operation may also include other steps, for example, reeling up of the printed packaging material into a rolled (wound) form.

Description

Polyethylene films and some wax coatings used in packaging materials may not degrade if the package is composted. Recycling of packaging materials containing polyethylene films and wax coatings may be limited and costly because of special equipment which may be necessary for repulping, as well as the various process steps which may be required prior to reintroducing such a slurry into a recycling stream along with, for example, office waste paper. Multilayered plastic film ream wraps having a center ply of polyethylene in between two other plys of paper may be particularly difficult to recycle (e.g., repulp) because of the polyethylene ply. Wax paper coating systems may contain such a high loading of wax as to be unacceptable for recycling and for repulping for papermaking, including for paper substrates used in packaging materials such as ream wrap.

Embodiments of the printed (and unprinted) packaging material (e.g., ream wrap) of the present invention provide adequate moisture/vapor barrier protection for products (e.g., paper) contained within the packaging material, but may also be recyclable (e.g., repulpable). Embodiments of the printed (and unprinted) packaging material (e.g., ream wrap) of the present invention may comprise: a paper substrate having an outer surface and inner surface; a print-receptive layer having an inner and an outer surface, wherein the print-receptive layer is positioned over the paper substrate outer surface and having a Parker Print Smoothness value of about 1.5 or less (such as about 1 or less); and a moisture barrier layer comprising one or more energy-cured polymers positioned over the print-receptive layer outer surface (e.g., the entire print-receptive layer outer surface), wherein the packing material has a water vapor transportation rate of about 500 g/m$^2$/day or less, such as about 310 g/m$^2$/day or less (e.g., about 155 g/m$^2$/day or less). In some embodiments, the print-receptive layer comprises one or more printed areas, with the moisture barrier layer being positioned over the print-receptive layer so as to include the printed areas, i.e., providing a printed packaging material.

An embodiment of a recyclable printed packaging material of the present invention is further illustrated in FIG. 1. Referring to FIG. 1, the packaging material is referred to generally as 100. Packaging material 100 comprises a base paper substrate, indicated as 104, having an inner surface 108 and an outer surface 112. Paper substrate 104 comprises at least about 40% recyclable pulp fibers, such as at least about 60% recyclable pulp fibers. The pulp fibers may comprise softwood fibers, hardwood fibers, or a mixture of softwood and hardwood fibers. For example, the paper substrate 104 may comprise from about 5 to about 95% (such as from about 25 to about 75%) softwood fibers and from about 5 to about 95% (such as from about 25 to about 75%) hardwood fibers. Paper substrate 104 may also have, for example, a basis weight of from about 30 to about 100 lbs/3300 sq. ft. (such as from about 45 to about 75 lbs/3300 sq. ft.), and a caliper (thickness) of from about 2 to about 5 mils (such as from about 3 to about 4 mils).

As shown in FIG. 1, packaging material 100 may also be provided with an optional inner surface paper sizing layer, indicated as 116, positioned, disposed, etc., adjacent inner surface 108 is. As further shown in FIG. 1, packaging material 100 may also be provided with an optional outer surface paper sizing layer, indicated as 120, positioned, disposed, etc., adjacent outer surface 108. Sizing layers 116 and 120 may comprise paper sizing starch, other paper sizing agents, etc., and are provided to decrease, reduce, minimize, etc., the penetration, wicking, spreading, etc., of water or ink into paper substrate 104. Sizing layers 116 and 120 may provide a coat weight of, for example, from about 0.5 to about 4 gsm, such as from about from about 1 to about 3 gsm.

As shown in FIG. 1, packaging material 100 may also be provided with an inner curl control layer (also referred to as a "backwash" or "wash" layer), indicated as 124, adjacent to and positioned underneath inner surface paper sizing layer 116. Curl control layer 124 may comprise, for example, starch, clay, starch crosslinkers (e.g., glyoxal, borax, zirconium carbonate, etc.), as well as optional components such as latexes, platy mineral pigments, etc., to further improve (decrease) the moisture vapor transport rate (MVTR). See commonly-assigned U.S. Published Appln. No. 20070020462 (Rudolph et al.), published Jan. 25, 2007, the entire contents and disclosure of which is herein incorporated by reference, which describes the composition and components of "backwash"/"wash" layers which may be used as an embodiment of curl control layer 124. Curl control layer 124 is normally adjacent the packaged product (e.g., ream of paper) and provides, for example, control against curling of the packaged paper (due to absorbed moisture). Curl control layer 124 may provide a coat weight of, for example, from about 0.25 to about 10 lbs./3300 sq. ft., such as from about from about 2 to about 6 lbs./3300 sq. ft.

As shown in FIG. 1, disposed, positioned, etc., over outer surface paper sizing layer 120 (as well as paper substrate 104) is a print-receptive layer, indicated as 128. Print-receptive layer 128 has an inner surface, indicated as 132, which is adjacent to and over outer surface paper sizing layer 120, as well as an outer surface, indicated as 136. Outer surface 136 has a Parker Print Smoothness value of about 1.5 or less, such as about 1 or less, which tends to make outer surface 136 less porous. Print-receptive layer 128 may comprise substrate pigments (e.g., clay, calcium carbonate, etc.) in amounts of, for example, from about 10 to about 90 parts (e.g., from about 35 to about 90 parts) clay based on print-receptive layer 128, from about 10 to about 30 parts (e.g., from about 15 to about 25 parts) calcium carbonate based on print-receptive layer 128, starch in amounts of, for example, from about 0.25 to about 10 parts (e.g., from about 0.5 to about 3 parts) based on print-receptive layer 128, latex in amounts of, for example, from about 10 to about 40 parts (e.g., from about 20 to about 30 parts) based on print-receptive layer 128, crosslinker such as dialdehydes (e.g., glyoxal, polyethoxylated dialdehydes, etc.) in amounts of, for example, from about 0.01 to about 1 parts (e.g., from about 0.02 to about 0.04 parts) based on print-receptive layer 128, and may be provided in a coat weight of, for example, from about 3 to about 15 lbs./3300 sq. ft. (such as from about 4 to about 12 lbs./3300 sq. ft., e.g., from about 9 to about 10 lbs./3300 sq. ft.).

When print colorant (e.g., ink) is deposited on print-receptive layer 128 (e.g., to print label or other descriptive information on packaging material 100) to create one or more printed images, print-receptive layer 128 becomes a printed layer. In some embodiments, deposition of printer colorant may be omitted, i.e., print-receptive layer 128 is an unprinted layer. In addition to providing a layer for receiving print colorant, print-receptive layer 128 may provide additional benefits. One such additional benefit is reducing the penetration of, and thus keeping on outer surface 136, the subsequently applied energy-curable coating because of the reduced porosity of outer surface 136 (due to the components in print-receptive layer 128, as well as the lower Parker Print Smoothness value of outer surface 136). Another benefit of print-receptive layer 128 is additionally improving (decreasing) the water vapor transmission rate (WVTR) of packaging material 104, again due to the reduced (moisture/vapor) porosity of print-receptive layer 128, and especially outer surface 136.

As shown in FIG. 1, print-receptive layer 128 comprises a printed area, indicated generally as 140. Printed area 140 is formed from the depositing of print colorant (e.g., ink) on outer surface 136 of print-receptive layer 128. As further shown in FIG. 1, disposed, positioned, etc., over print-receptive layer 128 (including printed area 140), and adjacent outer surface 136 is a moisture barrier layer, indicated as 144.

Initially, moisture barrier layer 144 comprises an energy-curable coating (comprising one or more energy-curable monomers disposed, positioned, etc., on or over outer surface 136 (e.g., the entire outer surface 136) of print-receptive layer 128. One benefit of using energy-curable coatings to form moisture barrier layer is the ability to increase the amount of solids present in the coating, and thus decrease amount the penetration of the coating into and through print-receptive layer 128, i.e., keeping more coating solids on outer surface 136. Upon curing (e.g., polymerization, crosslinking, etc.), the energy-curable coating is converted into one or more energy-cured polymers to create moisture barrier layer 144. Moisture barrier layer 144 may be provided in a coat weight of, for example, from about 2 to about 10 gsm, such as from about 3 to about 7 gsm, (e.g., from about 3.5 to about 5 gsm). Moisture barrier layer 144 provides additional moisture/vapor barrier protection for products (e.g., paper) contained within the packaging material 104 (e.g., ream wrap). After moisture barrier layer 144 is formed, packaging material 104 has (provides) a water vapor transportation rate (WVTR) of about 500 $g/m^2$/day or less, for example, about 310 $g/m^2$/day or less, such as about 155 $g/m^2$/day or less.

Various embodiments of a method for preparing a (recyclable) packaging material of the present invention according to embodiments of the present invention are also described herein. One embodiment of a method for preparing a recyclable packaging material comprises the following steps: (a) providing a printable material comprising: a paper substrate comprising at least about 40% recyclable paper fibers and having an outer surface and inner surface; and a print-receptive layer having an inner surface and a calendered outer surface, wherein the print-receptive layer inner surface is disposed, positioned, etc., over the paper substrate outer surface and wherein the calendered print-receptive layer outer surface has a Parker Print Smoothness value of about 1.5 or less; (b) applying an energy-curable coating comprising one or more energy-curable monomers over the calendered print-receptive layer outer surface (e.g., the entire print-receptive layer outer surface), including at least the printed areas; and (c) curing the energy-curable monomers to form a moisture barrier layer comprising one or more energy-cured polymers positioned over the calendered print-receptive layer outer surface to provide a recyclable packaging material having a water vapor transportation rate of about 500 $g/m^2$/day or less, for example, about 310 $g/m^2$/day or less, such as about 155 $g/m^2$/day or less. In some embodiments, a printed packaging material may be formed by including the following additional step: (d) prior to applying the energy-curable coating in step (b), depositing a print colorant on the calendered print-receptive layer outer surface to form one or more printed areas.

Another embodiment of a method for preparing a printed packaging material (which may include recyclable printed packaging materials) provided with a moisture barrier layer in a "single pass operation," and without repeated winding/unwinding of the material during the method, comprises the following steps: (a) providing an unreeled printable material comprising: a paper substrate having an outer surface and inner surface; and a print-receptive layer having an inner surface and an outer surface, wherein the print-receptive layer inner surface is positioned over the paper substrate outer surface and wherein the print-receptive layer outer surface has a Parker Print Smoothness value of about 1.5 or less; (b) depositing print colorant on the print-receptive layer outer surface to form one or more printed areas to provide a printed material; (c) applying to the printed material an energy-curable coating comprising one or more energy-curable monomers over the print-receptive layer outer surface (e.g., the entire print-receptive layer outer surface), including the printed areas, to provide a coated printed material; and (d) curing the energy-curable monomers to form a moisture barrier layer comprising one or more energy-cured polymers positioned over the print-receptive layer outer surface to provide a printed packaging material having a water vapor transportation rate of about 500 g/m$^2$/day or less, for example, about 310 g/m$^2$/day or less, such as about 155 g/m$^2$/day or less. In this embodiment of the method of the present invention, steps (a) through (d) are carried out as a single pass operation and without reeling up (e.g., rolling up, winding): the printed material of step (b) prior to carrying step (c); and the coated printed material of step (c) prior to carrying out step (d).

Figure 2:
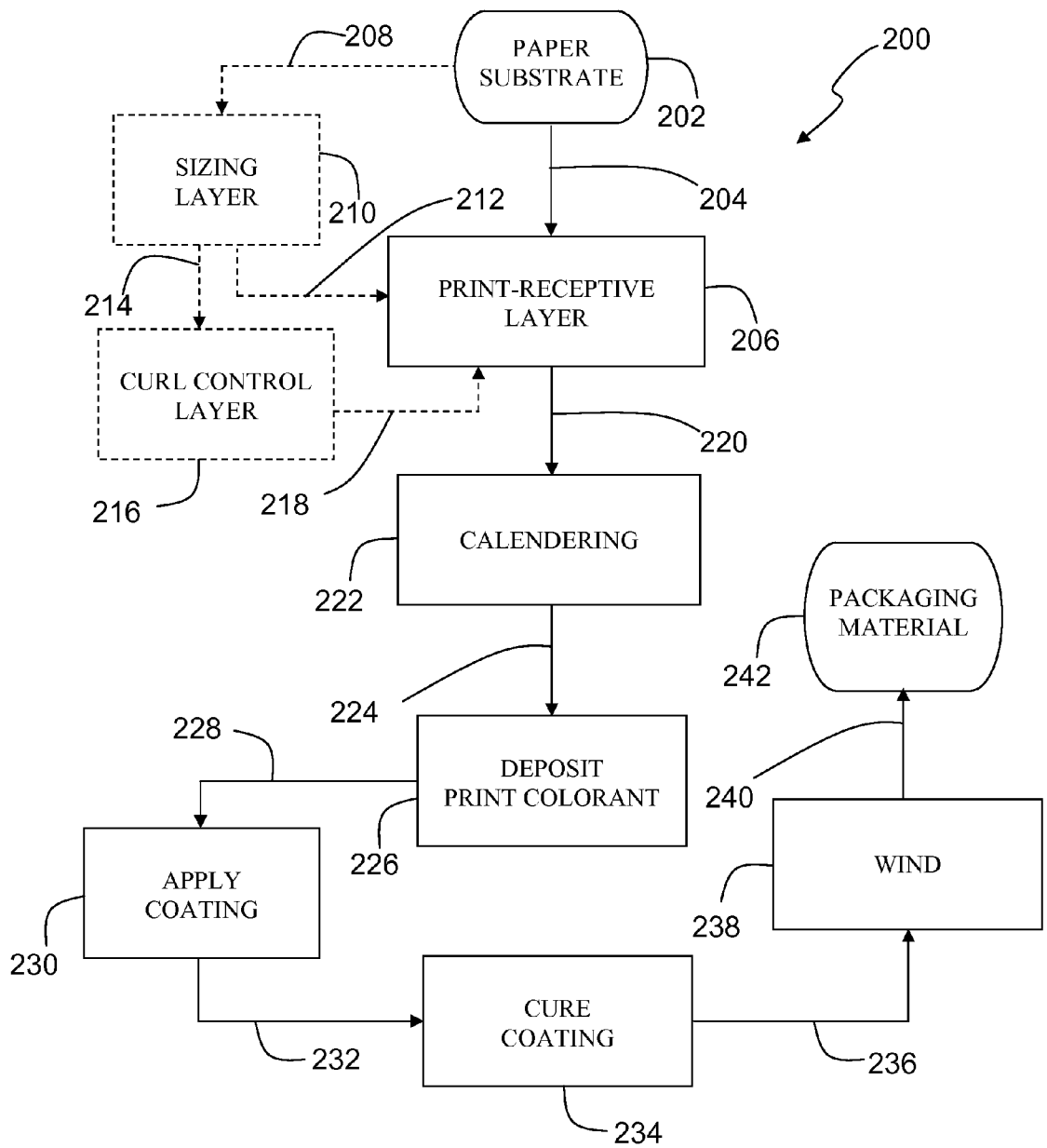
FIG. 2 is a flowchart to illustrate various embodiments of a method for preparing a (recyclable) printed packaging material according to embodiments of the present invention.

FIG. 2 is a flowchart to illustrate various embodiments of a method for preparing a (recyclable) printed packaging material according to embodiments of the present invention, and which is indicated generally as 200. In method 200, a Paper Substrate, indicated as 202 (corresponding to paper substrate 104 in FIG. 1), is provided, as indicated by arrow 204, with a print-pigment receptive layer (see Print-Receptive Layer, as indicated by step 206) on the outer surface (see surface 108 in FIG. 1) of Paper Substrate 202.

Alternatively, as indicated by arrow 208 in FIG. 2, Paper Substrate 202 may optionally be provided with an inner surface paper sizing layer and/or an outer surface paper surface sizing layer (collectively referred to as Sizing Layer, as indicated by step 210, and corresponding to surface sizing layers 116 and 120 in FIG. 1), before being provided with Print-Receptive Layer 206, as indicated by step 212. Sizing Layer step 212 may be carried by using any conventional size press to apply an inner and/or outer surface paper sizing layer to Paper Substrate 202. Also alternatively, as indicated by arrow 214 in FIG. 2, the inner surface paper sizing layer 116 may be optionally provided with a Curl Control Layer (corresponding to curl control layer 124 in FIG. 1), as indicated by step 216 in FIG. 2, before being provided with Print-Receptive Layer 206, as indicated by step 218.

As indicated by arrow 220 in FIG. 2, Print-Receptive Layer 206, which may have, for example, an initial Parker Print Smoothness value of at least about 2.5 (e.g., in the range from about 2.5 to about 5), may be calendered (e.g., supercalendered), as indicated by Calendering step 222, to a lower Parker Print Smoothness value of about 1.5 or less, such as about 1 or less (e.g., to reduce the porosity of outer surface 136/print-receptive layer 128 in FIG. 1). In some embodiments, Calendered material 222 may be optionally reeled, wound, rolled up, etc., before carrying out any further steps in method 200.

As further shown in FIG. 2, and as indicated by arrow 224, print colorant may be deposited on the print-receptive layer of the Calendered material 222 (see Deposit Print Colorant in FIG. 2, as indicated by step 226) to form one or more printed areas (e.g., corresponding to printed area 140 in FIG. 1). (In some embodiments where the Calendered material 222 is reeled up, wound, rolled up, etc., Calendered material 222 will need to be unreeled, unwound, unrolled, etc., before carrying out Deposit Print Colorant step 226.) In one embodiment, Deposit Print Colorant step 226 may be carried out by using flexographic printing to form one or more printed areas (e.g., corresponding to printed area 140 in FIG. 1). In some embodiments where unprinted packaging materials are prepared by process 200, Deposit Print Colorant step 226 may be omitted.

After carrying out Deposit Print Colorant step 226, and as indicated arrow 228, an energy-curable coating may be applied (see Apply Coating in FIG. 2, indicated by step 230) over at least a portion the printed print-receptive layer (e.g., part of the print-receptive layer, including the printed areas, or the entire print-receptive layer) of the printed material from step 226. Apply Coating step 230 may be carried out in a variety ways, including by rod coating, metering roll coating, gravure printing, Dahlgren application, etc. In one embodiment, Apply Coating step 230 may be carried out by using flexographic printing, for example, when Deposit Print Colorant step 226 is carried out by using flexographic printing. When the Apply Coating step 230 is carried out using flexographic printing, the energy-curable coating may have a relatively fluid viscosity of, for example, from about 10 to about 60 seconds (as measured by the Zahn cup test), such as a viscosity in the range of from about 20 to about 60 seconds.

As indicated by arrow 232, after carrying out Apply Coating step 230, the energy-curable coating may then be cured to form the moisture barrier layer (see Cure Coating in FIG. 2, indicated by step 234), which corresponds to moisture barrier layer 144 in FIG. 1. As indicated by arrow 236, after carrying out Cure Coating step 234, the printed packaging material with the cured moisture barrier layer may be reeled, rolled, or wound up (see Wind in FIG. 2, indicated by step 238). As indicated by arrow 240, after carrying out Wind step 238, a roll of printed packaging material (see Packaging Material in FIG. 2, indicated as oval 242) is provided which may be used to provide, for example, ream wrap, roll wrap, containers, boxes, etc. In some embodiments of method 200, at least steps 226, 230, 234, (and optionally 238) are carried out as a "single pass operation" and without winding/unwinding after step 226 and before step 238.

Procedure for Determining Brightness Gain Per Yield Loss for Repulped/Recovered Materials (Flotation Test)

The material to be tested is cut into approximately 1 in.×1 in. pieces. The pieces are soaked overnight in tap water.

Water is pre-heated in a laboratory pulper (Adirondack Hydrapulper with four 3-inch tall vanes at right angles to each other) and the material to be tested is added to the pulper. Pulper conditions used are as follows:

Target Pulper Consistency: 12% solids
Target Pulper Temperature: 50° C.
Pulper Speed: 330 rpm
Time in Pulper: 12-15 minutes The pulped material is diluted to a consistency of less than 2% solids content and is screened using a vibrating screen containing 0.010 in. slots. The screen pressure is limited to approximately 4 inches of water head. The screen rejects (i.e., material not passing through the screen) are collected, dried, and expressed (calculated) as a mass percentage of the total material which is screened. The screen accepts (material which passes through the screen) are centrifuged at a speed of at least 2100 rpm to a target solids content of 30% to 40% (moisture content is measured and recorded). A Hobart low speed, low-shear industrial kitchen mixer is then used to break up the centrifuged screen accepts into loose clumps ranging from approximately 3 to 15 mm in diameter. The screen accepts are then used as feedstock to a Readco Model RK1-CP Continuous Processor (which uses helical paddles designed both for conveying and mixing) operating at a speed of 300 rpm with the restrictor plate fully open. The pulp is kneaded by this Processor and contaminants are reduced in size.

The kneaded pulp is then subjected to further processing in a flotation cell. The pulp is diluted to approximately a 1.3% solids consistency to be within the operating limits of the lab flotation cell. Dilution is carried out in two steps to ensure that the kneaded pulp is de-nitted, since kneaded pulp may contains many fiber bundles (referred to as "nits") which otherwise tend to float out during the test. First, each sample is repulped in a Hobart-Kitchenaid Mixer at 12% consistency using 110° F. tap water for dilution. Surfactant (Lexair LA-S-105 at 1 lb ton) is added at the start of this step. The Hobart mixer is run for 5 minutes at speed setting 1 and then a further 5 minutes at speed setting 2. The pulp is then diluted to 4% consistency, again using 110° F. tap water, and allowed to rest for 30 minutes.

The diluted pulp is further diluted with tap water to give 6 liters at approximately a 1.3% solids consistency and is then floated in the lab flotation cell. The lab flotation cell is a modified Wemco lab cell and is run at 900 rpm impeller speed with a metered air addition of 3 liters per minute. The lab system recirculates pulp from a heated, temperature-controlled reservoir through the Wemco cell using a Masterflex peristaltic pump. The cell level is maintained with a simple weir for vat level control. The stock circulation flow is 3 lpm; the total pulp capacity of the lab system is 6 liters.

The flotation stock temperature is brought to 110° F. before the flotation run is carried out. The stock is circulated in the system without added air for a half-hour to ensure stable temperature conditions. Air addition is then begun and flotation is continued until 240 grams of foam is collected (approximately 12 minutes). Pulp samples from the flotation cell are collected at the start and the end of the flotation run. Foam volume and consistency are converted to yield loss. Pulp samples are also made into small pads for brightness analysis. Yield Loss (YL) (%)=100*{(Foam Consistency)*(Foam Mass)}/{(Starting Consistency)*(Starting Mass)}. Pad brightness is read on a Technidyne Brightness Meter (model ERIC-950). Brightness Gain (BG)=Brightness (End)–Brightness (Start). The brightness gain per yield loss for the repulped/recovered material is then calculated as BG/YL.

EXAMPLES

The preparation of an embodiment of recyclable ream wrap is described below:

A paper substrate comprising 25-75% softwood fibers and 25-75% hardwood fibers is used. The paper substrate has a basis weight of 45-75 lbs/3300 sq. ft. and a caliper of 3-4 mils.

A surface paper sizing agent comprising paper sizing starch is optionally applied to either or both surfaces of the paper substrate using a size press. Each of the sizing layers formed provides a coat weight of 1-3 gsm.

A print-receptive layer is prepared from the following ingredients:

TABLE 1

| Pigment | | |
|---|---|---|
| Pigment Type | Product Name | Parts |
| Clay | Astracote | 85 |
| Calcium Carbonate | Covercarb HP | 15 |

TABLE 2

| Other Ingredients | | |
|---|---|---|
| Type | Product Name | Parts |
| Starch | Ethylex 2040 | 1 |
| Latex | Dow 30985.50 | 25 |
| Crosslinker | Sequarez 765 | 0.035 |
| Viscosity Modifier | Admiral 3089 | 0.30 |

The ingredients in Tables 1 and 2 are combined and mixed together. After the ingredients in Tables 1 and 2 are combined and mixed together, the mixture is applied to the outer surface of the paper substrate (surface sized or unsized) with a commercial scale blade coater to provide a coat weight of 9-10 lbs/3300 sq. ft., and dried to form the print-receptive layer.

A curl control/"backwash" layer is prepared from the following ingredients:

TABLE 3

| Curl Control Layer Ingredients | | |
|---|---|---|
| Type | Product Name | Parts |
| Starch | Ethylex 2040 | 171 |
| Clay | Astracote | 100 |
| Starch Crosslinker | Earth Works Linkup Plus (Glyoxal) | 5% on dry starch |

The ingredients in Table 3 are combined and mixed together. After the ingredients in Table are combined and mixed together, the mixture is applied to the inner surface of the paper substrate (surface sized or unsized) with a size press to provide a coat weight of 3-4 lbs./3300 sq. ft., and dried to form the curl control layer.

After the print-receptive layer and curl control layer are applied to the paper substrate, the resulting material is calendered using a commercial scale supercalender to a Parker Print Smoothness value of about 1 or less. The basis weight and caliper of the calendered material is approximately 60 lbs/3300 sq. ft. and 3 mils, respectively. The calendered material is printed on using six-color flexography using a commercial flexographic printer Immediately after the six-color printing by flexography, an energy-curable coating (Sun-Beam FF 9503-T, made by SunChemical of Carlstadt, N.J., comprising 40-70% trimethylolpropane ethoxy triacrylate, 25-40% epoxy acrylate oligomers, and tripropylene glycol diacrylate) is also applied using flexography, and the coating is then cured using electron-beam irradiation to provide a printed ream wrap.

The properties of the resulting printed ream wrap are as follows:

TABLE 4

| Printed Ream Wrap Properties | |
|---|---|
| Property | Units |
| WVTR | 117 g/m$^2$/day |
| Caliper | 3.3 mils |
| Basis Weight | 63 lbs/3300 sq. ft. |
| Burst Strength | 38 psi |
| Static Coefficient of Friction (Machine Direction, barrier against barrier | 0.41 |
| Brightness Gain Per Yield Loss | at least 0.3 |

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. An article comprising a recyclable packaging material comprising:
   a paper substrate comprising at least about 40% recyclable pulp selected from the group consisting of softwood fibers, hardwood fibers and mixtures of softwood and hardwood fibers, the paper substrate having an inner surface and an outer surface;
   a print-receptive layer comprising from about 10 to about 90 parts clay by weight of the print-receptive layer; from about 10 to about 30 parts calcium carbonate by weight of the print-receptive layer; from about 0.25 to about 10 parts starch; from about 10 to about 40 parts latex by weight of the print-receptive layer; and from about 0.01 to about 1 parts crosslinker by weight of the print-receptive layer, the print-receptive layer having an inner surface and an outer surface, wherein the inner surface of the print-receptive layer is positioned over the outer surface of the paper substrate and wherein the outer surface of the print-receptive layer has a Parker Print Smoothness value of about 1.5 or less and one or more printed areas disposed thereon; and
   a moisture barrier layer comprising one or more energy-cured polymers obtained by curing one or more of the following energy-curable monomers: trimethylolpropane ethoxy triacrylate, epoxy acrylate oligomers, or tripropylene glycol diacrylate, the moisture barrier layer being positioned over the outer surface of the print-receptive layer and over the one or more printed areas, and wherein the recyclable packaging material has a water vapor transportation rate of about 500 g/m$^2$/day or less.

2. The article of claim 1, wherein the recyclable packaging material is a ream wrap.

3. The article of claim 1, which further comprises a curl control layer positioned underneath the inner surface of the paper substrate.

4. The article of claim 3, which further comprises an inner surface paper sizing layer positioned adjacent the inner surface of the paper substrate, and wherein the curl control layer is positioned adjacent to and underneath the inner surface paper sizing layer.

5. The article of claim 1, which further comprises an outer surface paper sizing layer positioned over the outer surface of the paper substrate, and wherein the inner surface of the print-receptive layer is positioned over and adjacent to the outer surface paper sizing layer.

6. The article of claim 1, wherein the moisture barrier layer is positioned adjacent the outer surface of the print-receptive layer.

7. The article of claim 1, wherein the print-receptive layer is an ink-receptive layer.

8. The article of claim 1, wherein the print-receptive layer is an ink-receptive layer having a Parker Print Smoothness value of about 1 or less.

9. The article of claim 1, wherein the recyclable packaging material has a water vapor transportation rate of about 310 g/m$^2$/day or less.

10. The article of claim 9, wherein the recyclable packaging material has a water vapor transportation rate of about 155 g/m$^2$/day or less.

11. The article of claim 1, wherein the moisture barrier layer is positioned over the entirety of the outer surface of the print-receptive layer.

12. The article of claim 1, wherein the paper substrate comprises at least about 60% recyclable pulp fibers.

13. The article of claim 1, wherein the paper substrate comprises from about 5 to about 95% softwood fibers, and from about 5 to about 95% hardwood fibers.

14. The article of claim 13, wherein the paper substrate comprises from about 25 to about 75% softwood fibers, and from about 25 to about 75% hardwood fibers.

15. The article of claim 1, wherein the paper substrate has a basis weight of from about 30 to about 100 lbs/3300 sq. ft and a caliper of from about 2 to about 5 mils.

16. The article of claim 15, wherein the paper substrate has a basis weight of from about 45 to about 75 lbs/3300 sq. ft and a caliper of from about 3 to about 4 mils.

17. The article of claim 1, wherein the print-receptive layer comprises from about 35 to about 90 parts clay by weight of the print-receptive layer; from about 15 to about 25 parts calcium carbonate by weight of the print-receptive layer; from about 0.5 to about 3 parts starch; from about 20 to about 30 parts latex by weight of the print-receptive layer; and from about 0.02 to about 0.04 parts crosslinker by weight of the print-receptive layer.

18. The article of claim 17, wherein the print-receptive layer is provided in a coat weight of from about 3 to about 15 lbs./3300 sq. ft.

19. The article of claim 18, wherein the print-receptive layer is provided in a coat weight of from about 4 to about 12 lbs./3300 sq. ft.

20. The article of claim 1, wherein the moisture barrier layer is provided at a coat weight of from about 2 to about 10 gsm.

21. The article of claim 20, wherein the moisture barrier layer is provided at a coat weight of from about 3 to about 7 gsm.

22. The article of claim 1, wherein the recyclable packaging material provides a brightness gain per yield loss value of at least about 0.3.

23. The article of claim 22, wherein the recyclable packaging material provides a brightness gain per yield loss value of at least about 0.5.

24. An article comprising a recyclable packaging material comprising:
   a paper substrate comprising at least about 40% recyclable pulp fibers selected from the group consisting of softwood fibers, hardwood fibers and mixtures of softwood and hardwood fibers, the paper substrate having an inner surface and an outer surface;
   a print-receptive layer having an inner surface and an outer surface, wherein the inner surface of the print-receptive layer is positioned over the outer surface of the paper substrate and wherein the outer surface of the print-receptive layer has a Parker Print Smoothness value of about 1.5 or less and has one or more printed areas disposed thereon; and
   a moisture barrier layer comprising one or more energy-cured polymers obtained by curing one or more of the following energy-curable monomers: trimethylolpropane ethoxy triacrylate, epoxy acrylate oligomers, or tripropylene glycol diacrylate, the moisture barrier layer being positioned over the outer surface of the print-receptive layer and over the one or more printed areas, and wherein the recyclable packaging material has a water vapor transportation rate of about 500 g/m$^2$/day or less; and a curl control layer positioned underneath the inner surface of the paper substrate.

25. The article of claim 24, which further comprises an inner surface paper sizing layer positioned adjacent the inner surface of the paper substrate, and wherein the curl control layer is positioned adjacent to and underneath the inner surface paper sizing layer.

* * * * *